(Model.)

C. G. ANDERSON.
DRIVE CHAIN.

No. 302,812. Patented July 29, 1884.

WITNESSES

INVENTOR
Chas. G. Anderson
by
Attorney

UNITED STATES PATENT OFFICE.

CHARLES G. ANDERSON, OF COLUMBUS, ASSIGNOR TO JASON McVAY, OF SAME PLACE, AND NATHAN JOSEPH, OF ZANESVILLE, OHIO.

DRIVE-CHAIN.

SPECIFICATION forming part of Letters Patent No. 302,812, dated July 29, 1884.

Application filed May 16, 1884. (Model.)

*To all whom it may concern:*

Be it known that I, CHARLES G. ANDERSON, of Columbus, in the county of Franklin and State of Ohio, have invented certain new and useful Improvements in Drive-Chains; and I do hereby declare that the following is a full, clear, and exact description thereof, reference being had to the accompanying drawings, and to the letters of reference marked thereon, which form part of this specification.

The object I have in view is to provide means whereby the detachable links of a chain may with ease and facility be united or disconnected; and to these ends my invention consists in the peculiar construction of the connecting-bolt and such other features of novelty as will be fully understood from the following description, when taken in connection with the annexed drawings, in which—

Figure 1:
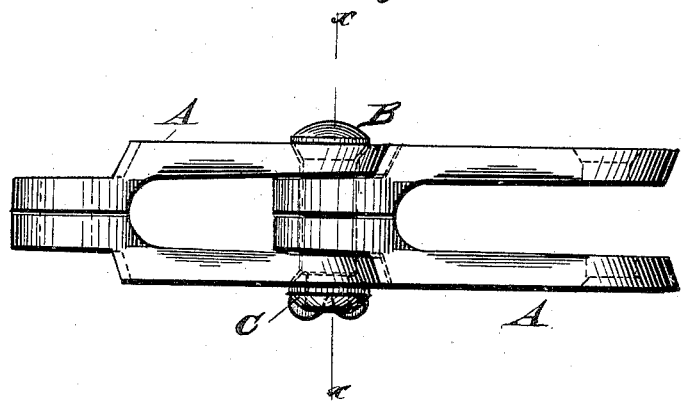
Figure 2:
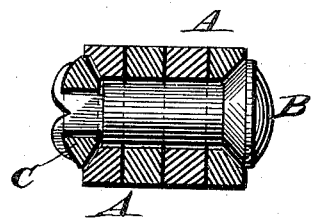
Figure 3:
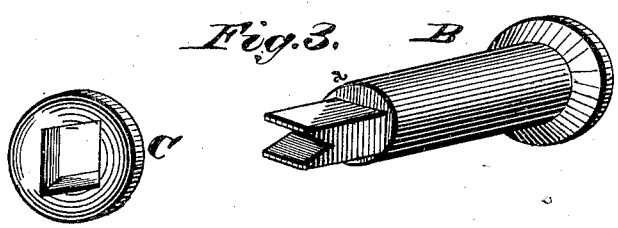

Figure 1 is a plan view of a portion of a drive-chain. Fig. 2 is a transverse section on line $x$ $x$, Fig. 1; and Fig. 3, a perspective view of bolt and washer.

Similar letters of reference denote like parts.

As each link of my chain is composed of duplicate side pieces, it is only necessary to describe the construction of one.

A represents one of the side pieces forming the link, which at one end is turned inward or stepped, and its shoulder is rounded inward, so that when placed opposite the other piece, in proper position, an open link is formed, and the inclosing ends of the next link will be flush with its sides. The end of the side A that is stepped is provided with a countersunk bolt-hole, and the ends of both sides of the links are rounded, as fully seen in the drawings.

B represents a bevel-headed bolt, which has a bifurcated end, the object of which will be more fully seen hereinafter. The body or shank of this bolt is cylindrical, but the end that is bifurcated is made square in cross-section, thus forming shoulder $a$, which shoulder is so formed or located on the bolt with respect to the width of the links that it will project a little beyond the lower edge of the countersink.

C represents a beveled washer, which fits snugly upon the bifurcated end of bolt B and within the countersink of side A and against the shoulder of the bolt.

My links are formed by placing the stepped ends of the two side pieces, A A, in close contact, then inclosing them with the ends of the adjacent couplet and inserting the bolt. The washer C is then slipped over the bifurcated end of the bolt, and its forked ends bent down firmly against said washer. It will thus be seen that I practically have a solid-headed bolt on both sides of the link, which renders the chain very strong.

When it is desired to disconnect the links, the ends of the bolt are bent up, and with a punch and mallet it is easily driven out, which operation also straightens the ends that have been bent down, so that the bolt may easily be replaced in position when required.

I do not lay special claim to the construction of the bolt, as I propose filing a separate application therefor.

What I claim, and desire to secure by Letters Patent, is—

The combination of links A A, having countersunk holes, a washer, and a bolt having a square bifurcated end and a shoulder, all constructed and adapted to operate substantially as and for the purposes described.

In testimony that I claim the foregoing as my own I affix my signature in presence of two witnesses.

CHARLES G. ANDERSON.

Witnesses:
J. F. HOFFMAN,
GEO. P. BRAINARD.